(12) United States Patent
Hluchan

(10) Patent No.: US 7,793,446 B2
(45) Date of Patent: Sep. 14, 2010

(54) ADVERTISING/PROMOTIONAL DISPLAY SYSTEM AND MAILER

(75) Inventor: Erik S. Hluchan, Deep River, CT (US)

(73) Assignee: Structural Graphics LLC, Essex, CT (US)

( * ) Notice: Subject to any disclaimer, the term of this patent is extended or adjusted under 35 U.S.C. 154(b) by 218 days.

(21) Appl. No.: 12/215,948

(22) Filed: Jun. 30, 2008

(65) Prior Publication Data

US 2009/0013567 A1 Jan. 15, 2009

Related U.S. Application Data

(60) Provisional application No. 60/959,385, filed on Jul. 12, 2007.

(51) Int. Cl.
*G09F 1/06* (2006.01)
(52) U.S. Cl. .................. 40/124.08; 206/308.1
(58) Field of Classification Search ............ 40/124.06, 40/124.08, 491, 539, 738, 611.11; 206/308.1, 206/76; 229/92.8, 115; 446/147, 148
See application file for complete search history.

(56) References Cited

U.S. PATENT DOCUMENTS

| | | | |
|---|---|---|---|
| 5,055,084 A * | 10/1991 | Jokic | 446/486 |
| 5,613,612 A | 3/1997 | Davault | |
| 5,641,063 A | 6/1997 | Gambardella et al. | |
| 5,713,462 A | 2/1998 | Hansen | |
| 5,738,221 A * | 4/1998 | Van Witt et al. | 206/768 |
| 5,901,843 A | 5/1999 | Gambardella et al. | |
| 6,237,265 B1 * | 5/2001 | Crowell | 40/491 |
| 6,505,737 B1 | 1/2003 | Sherman | |
| 6,612,433 B2 | 9/2003 | McKenzie | |
| 2003/0230515 A1 | 12/2003 | Mouyal | |
| 2004/0035727 A1 | 2/2004 | O'Brien et al. | |
| 2006/0144728 A1 | 7/2006 | Skarin | |

FOREIGN PATENT DOCUMENTS

FR 2865121 1/2004

* cited by examiner

*Primary Examiner*—Joanne Silbermann
(74) *Attorney, Agent, or Firm*—Melvin I. Stoltz

(57) ABSTRACT

By providing a housing and a cooperating slider member cooperatively associated with each other, with the slider member being removable from the housing for simultaneously activating the housing to automatically form a three-dimensional object, a unique, hands-on, printed, visually exciting and interest generating advertising/promotional product is attained which can be used for a wide variety of promotions, including use as a mailer. The system of the present invention provides an exciting and surprising result which is not anticipated by the user, and can be produced in a wide variety of alternate forms and/or configurations.

17 Claims, 4 Drawing Sheets

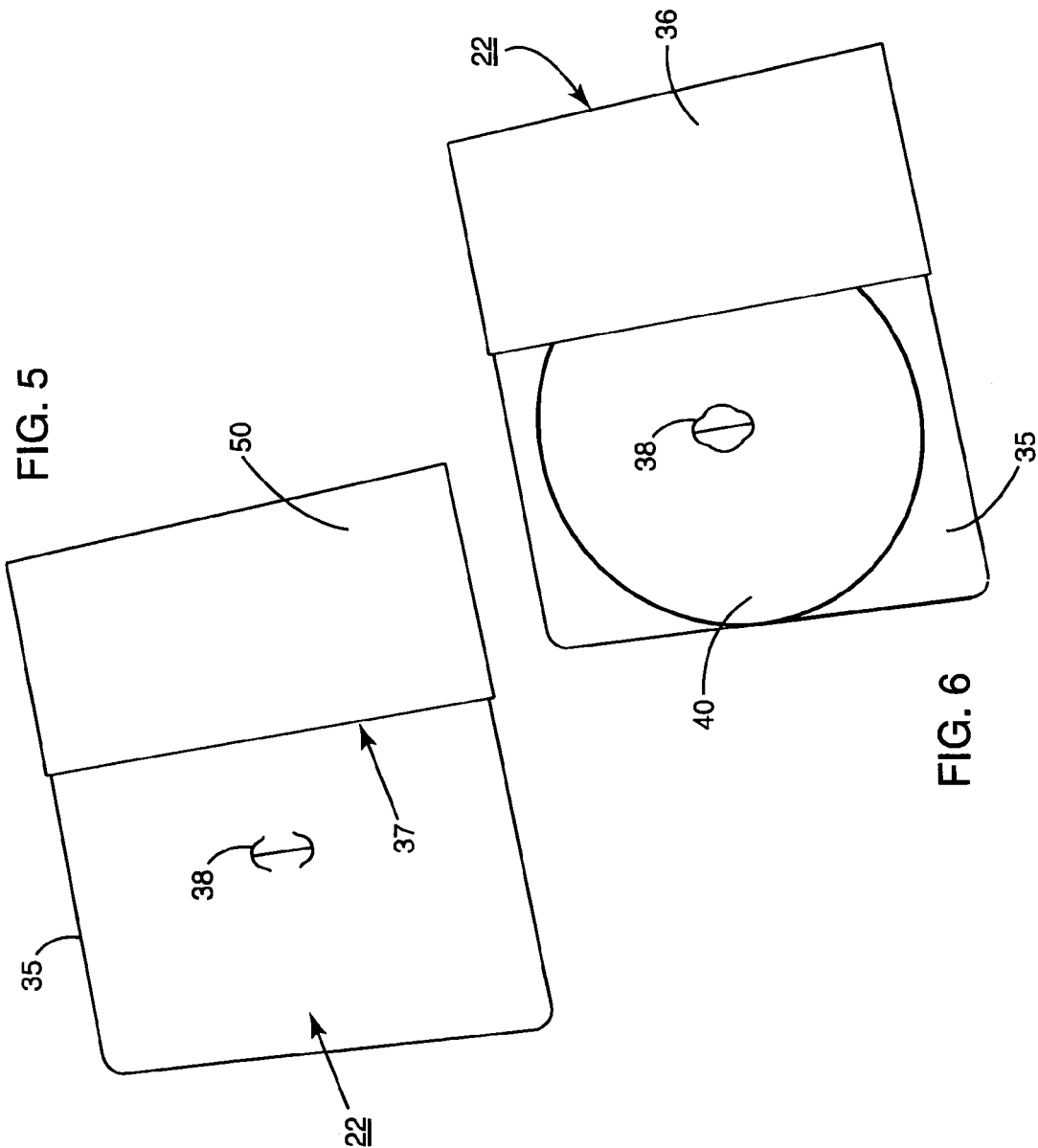

ADVERTISING/PROMOTIONAL DISPLAY SYSTEM AND MAILER

This application is related to U.S. Provisional Patent Application Ser. No. 60/959,385, filed Jul. 12, 2007 entitled ADVERTISING/PROMOTIONAL DISPLAY SYSTEM AND MAILER.

TECHNICAL FIELD

This invention relates to advertising/promotional display systems and, more particularly, to advertising/promotional display systems for providing visually exciting and interest generating products as well as self-contained, integrated, mailing systems with promotional displays.

BACKGROUND ART

With the ever-increasing quantity of products and services being offered to consumers, substantial interest has been given to promotional systems for advertising such products and services. In this regard, a wide variety of advertising displays and promotional literature has been created and distributed to consumers. However, due to the deluge of material to which average consumers are constantly exposed, greater emphasis has been placed on developing eye-catching visual displays and promotional material which stand out as being visually unique in order to receive consumer attention.

Although various novelty products and printed displays have been created in an attempt to satisfy this demand, these prior art products have failed to provide the desired interest generating result with production costs which advertisers are capable of justifying. In attempting to generate a unique advertising display, some prior art products have employed complex folding systems which produce a three-dimensional display when activated or unfolded.

In spite of the unique visual appearance generated by such products, the overall cost of production and complexity of the assembly of these systems has prevented such prior art systems from becoming popular. In particular, many prior art systems require multi-part segments to be aligned or placed in specific registered positions or locations. This requirement is both time consuming and costly.

Other prior art displays have attempted to generate consumer interest by providing unique visual images or other indicia as an integral part of the display. However, these prior art attempts have also failed to generate the consumer interest being sought, largely due to an inability to physically involve the consumer in the promotion or display operation.

Furthermore, the ever increasing consumer demand seeks to obtain promotional products which produce unique and/or surprising results. In this regard, consumers are continuously seeking products which will produce a surprising visual effect when used.

In addition to providing unique, eye-catching, visual displays in promotional material which are used as handouts or giveaway products, the industry is also seeking to have product mailing systems which incorporate similar eye-catching visual displays. In this regard, unique constructions which are capable of producing interest generating mailing systems are desired by the industry, but this need and desire has not been satisfied by prior art constructions.

Therefore, it is a principal object of the present invention to provide a printed advertising or promotional product which is capable of being produced at a reasonable cost and provides an exciting, interest generating display.

Another object of the present invention is to provide a printed advertising or promotional product having the characteristic features described above, which enables the consumer to physically control the presentation of the display in a unique, hands-on manner.

Another object of the present invention is to provide a printed advertising or promotional product having the characteristic features described above, which is capable of mass production and assembly.

Another object of the present invention is to provide a printed advertising or promotional product having the characteristic features described above, which is completely produced and assembled without requiring special segment alignment or registration.

A further object of the present invention is to provide a printed advertising or promotional product having the characteristic features described above, which provides a unique, eye-catching, exciting and surprising visual change which is produced in response to action taken by the consumer.

Another object the present invention is to provide a printed advertising or promotional product having the characteristic features described above, which is produced in the form of a mailing system for enabling the promotional advantages of this invention to be used as a mailer.

Other and more specific objects will in part be obvious and will in part appear hereinafter.

SUMMARY OF THE INVENTION

By employing the present invention, all of the difficulties and inabilities of the prior art are eliminated and a unique, hands-on, printed, visually exciting and interest generating advertising/promotional product is attained which can be used for a wide variety of promotions, including use as a mailer. This desirable and previously unattainable result is realized in the present invention by providing a unique, pre-printed promotional system which can be produced in a wide variety of alternate forms and/or configurations.

Regardless of the printed form or configuration desired, the promotional system of the present invention employs a housing and a cooperating slider member cooperatively associated with each other. In particular, the slider member is removable from the housing and simultaneously activates the housing to automatically form a three-dimensional object. In this way, the system of the present invention provides an exciting and surprising result which is not anticipated by the user.

In the basic, principal construction of the present invention, the promotional system comprises two cooperating components which are cooperatively associated to each other in sliding interengagement. Although two components are required for achieving the basic construction, alternate embodiments of the present invention may incorporate additional components for providing a further enhanced visual impact.

In the preferred embodiment of the basic construction, the promotional system of the present invention incorporates a substantially flat, two-dimensional housing, which is open on one end, and a slider member mounted in the housing and cooperatively associated with the housing for longitudinal, sliding movement related thereto. In addition, the housing incorporates activation means mounted inside the housing which automatically causes the housing to be formed into a three-dimensional object whenever the slider member is removed.

In order to achieve the desired automatic, surprising, and interest generating creation of a three-dimensional, pop-up graphic element, the housing is constructed for being automatically movable from a first, substantially flat, two-dimensional configuration into a second, fully erect, three-dimensional configuration. In its preferred configuration, the housing comprises a top panel, a bottom panel, three closed side edges, and one open side. In addition, movement controlling biasing means are mounted within the housing typically extending from the two opposed closed side edges, with the biasing means being constructed for automatically drawing the side edges towards each other and automatically converting the housing from its substantially flat, two-dimensional configuration into its fully erect, three-dimensional configuration.

As is more fully detailed below, although the biasing means continuously exerts a biasing force on the side edges of the housing, the housing is maintained in its first, substantially flat configuration, as long as the slider member is retained within the housing. However, whenever the slider member is removed from the housing, the biasing means is automatically activated and the housing is transformed into its second, fully erect, three-dimensional configuration. In this way, the user experiences an exciting and surprising result with the housing being automatically converted from a substantially flat component into a fully erect, three-dimensional component displaying the visually attractive indicia and information desired by the sponsor or manufacturer of the promotional system.

In the preferred embodiment, the slider member comprises a substantially flat, panel dimensioned for insertion in the housing and preferably comprising a holding zone or area for retaining promotional or advertising material in any desired form or format. In this regard, the slider member may incorporate a pocket which holds promotional material in the form of a booklet, pamphlet, or the like, or holding means for retaining a DVD or compact disc on which any desired information or promotional material is digitally retained.

Regardless of the form or format of the promotional material retained by the slider member, the sponsor of the advertising/promotional system of the present invention is able to provide a user or recipient with specifically targeted information using a promotional vehicle which provides excitement and interest along with the automatic creation of a unique three-dimensional object in a surprising and un-anticipated manner. As a result, the promotional/advertising system of the present invention provides a memorable, interesting, exciting, and pleasing result which heightens the interest and excitement of any recipient, assuring that the recipient will thoroughly review all of the promotional information retained therein.

In the preferred embodiment of the present invention, the advertising/promotional system is constructed with the slider member mounted, at least partially, within the housing, along with a portion of the slider member being affixed to the open edge of the housing. In this way, assurance is provided that both components are retained as a single, substantially integral construction. In addition, the edge of the slider member engaged with the edge of the housing is constructed for ease of separation or rupture, for enabling the user or recipient to quickly and easily separate the slider member from the housing. In this way, once the slider member has been disconnected from the housing, the slider member is easily removed from the housing, enabling the housing to be automatically converted from a substantially flat component into a three-dimensional, fully erect, pop-up display component.

In addition, by employing this construction, the advertising/promotional product is maintained in a substantially flat configuration in its unactivated position. Consequently, this advertising/promotional system can be easily used as a mailer being sent through any desired carrier service or federal mail system with ease and convenience. In addition, once the recipient receives the advertising/promotional system of the present invention and separates the slider from the housing, the desired surprising and interest generating results are attained.

The housing may be constructed in a wide variety of alternate configurations in order to achieve the desired automatic transformation from a substantially flat configuration into a three-dimensional configuration. However, in the preferred embodiment, it has been found that the housing member incorporates, in addition to the construction detailed above, biasing means in the form of an elastic band.

In addition, the opposed ends of the elastic band are secured to holding arms mounted to opposed side edges of the housing. Preferably, the holding arms are secured to the side edges and extend inwardly into the interior of the housing for receiving and retaining the elastic band. Furthermore, the top surface and the bottom surface of the housing are constructed with fold lines integrally formed therewith in order to assure that the housing is automatically transformed from its flat configuration into the precisely desired fully erect, three-dimensional, pop-up configuration.

By employing this construction, the housing is maintained in its first, substantially flat configuration as long as the slider member is inserted in the housing and at least partially retained therein. In this regard, whenever the slider member is inserted into the housing, the biasing means of the housing is unable to exert its force against the side edges of the housing due to the resistance provided by the slider member being retained therein. However, whenever the slider member has been fully removed from the housing, the biasing member automatically causes the side edges of the housing to be drawn towards each other, enabling the housing to be automatically transferred from its substantially flat configuration into his fully erect, three-dimensional, pop-up configuration. Furthermore, by forming fold lines on the surface panels of the housing, a precisely desired configuration is attained.

As is evident from the foregoing detailed discussion, the present invention can be configured in a wide variety of alternate constructions without departing from the scope of the present invention. In this regard, both the housing and the slider member may incorporate any desired pre-printed information including graphics, indicia, colors, alpha-numeric messages, etc., for delivering any information sought to be conveyed by the sponsor of the advertising/promotional system, as well as for providing entertainment, interests, and excitement to the recipient.

Furthermore, the incorporation of the three-dimensional pop up display element as an integral component of the advertising/promotional system further enhances the excitement and interest of the recipient or consumer. As a result, an exciting advertising/promotional display system is a realized and prior art drawbacks and difficulties are overcome.

In addition, apertures, windows, or display zones may be formed in the housing and/or the slider member for further enhancing the overall excitement and interest. Also, alternate constructions can be employed for providing biasing means for automatically converting the housing from its substantially flat configuration into its three-dimensional configuration. Regardless of the configuration or construction employed for providing the automatic movement of the housing from a folded configuration to a display configuration, or any other alternate construction employed for further enhancing the visual impact of the advertising/promotional system, it is intended that all variations made in accordance with the present invention shall be included within the scope of this invention.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the present invention, reference should be had to the following detailed description taken in connection with the accompanying drawings, in which:

FIG. 5 is a top plan view of one embodiment of the slider member as constructed for retaining a compact disc or DVD;

FIG. 6 is a top plan view of the embodiment of the slider member of FIG. 5 with a compact disk/DVD mounted in place;

DETAILED DISCLOSURE

Figure 1:
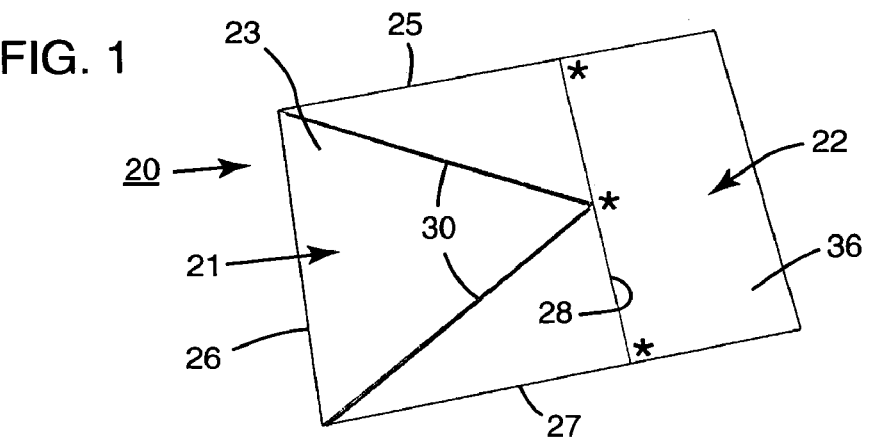
FIG. 1 is a perspective view of the advertising/promotional system of the present invention shown in its substantially flat, two-dimensional configuration.
Figure 2:
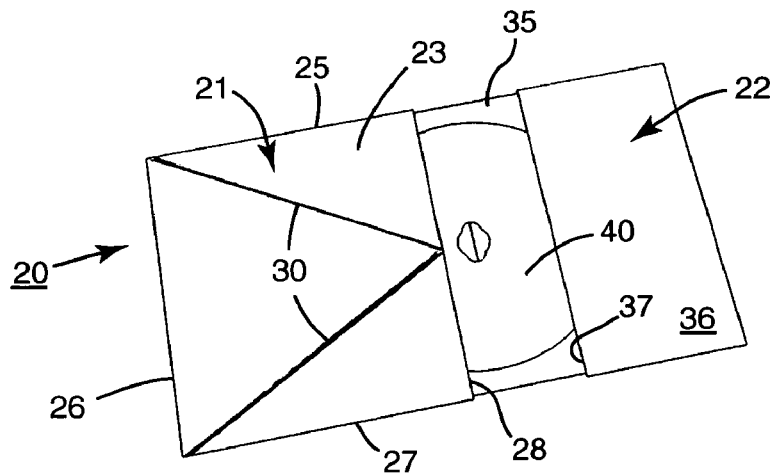
FIG. 2 is a perspective view of the advertising/promotional system of FIG. 1 shown with the slider partially removed from the housing.
Figure 3:
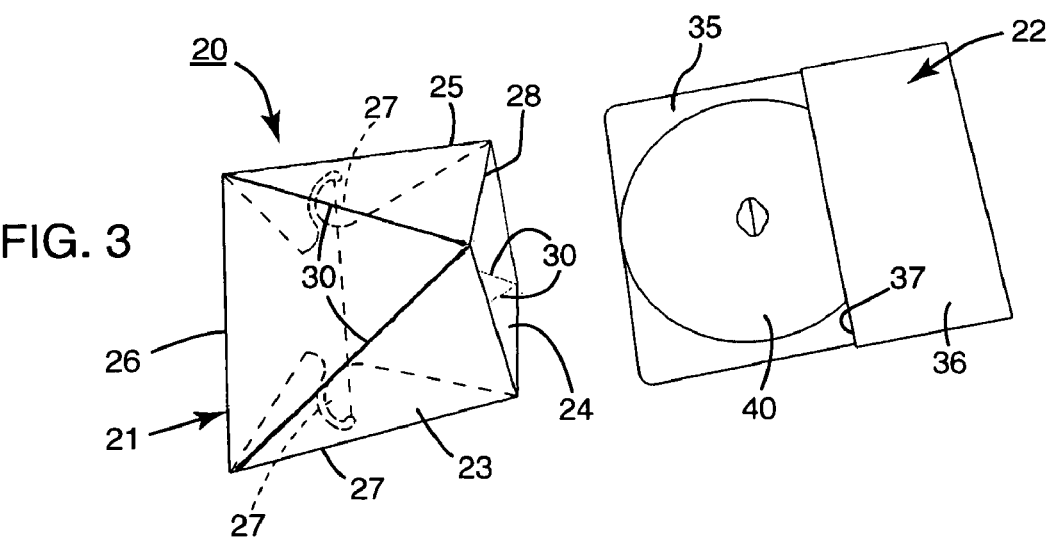
FIG. 3 is a perspective view of the advertising/promotional system of FIG. 1 shown with the slider member fully removed from the housing and the housing in the process of being automatically formed into a three-dimensional, pop-up display member.

By referring to FIGS. 1-8, along with the following detailed discussion, the construction and operation of the preferred embodiment of advertising/promotional display system and mailer 20 of the present invention can best be understood. Although this disclosure fully and completely details the preferred embodiment of the present invention, alternate embodiments and constructions can be employed without departing from the scope of the present invention. Consequently, it is to be understood that the embodiment shown and disclosed herein is provided for exemplary purposes and is not intended as a limitation of the present invention.

As clearly shown in FIGS. 1-8, advertising/promotional display system/mailer 20 comprises housing 21 and slider member 22. In the embodiment depicted, housing 21 incorporates top panel 23, bottom panel 24, closed side edges 25, 26, and 27, and open side edge 28. In addition, as is more fully detailed below, top panel 23 and bottom panel 24 incorporate fold lines 30 formed therein for enabling housing 22 to be transformed into a desired three-dimensional configuration.

In order to enable housing 21 to be automatically transformed from a substantially flat, two-dimensional configuration into a fully erect, three-dimensional, pop-up display configuration, housing 21 preferably comprises biasing means 45 positioned in the interior of housing 21. In the preferred embodiment, biasing means 45 comprises a rubber band. In addition, biasing means 45 is cooperatively associated with arm members 46 mounted inside housing 21 in direct association with side edges 25 and 27.

Preferably, each arm member 46 extends inwardly into housing 21 from its associated side edge, with biasing means 45 securely retained on a holding portion thereof. In this way, when housing 21 is in its substantially flat two-dimensional position, the ends of biasing means/rubber band 45 are stretched apart, thereby imparting a spring or biasing force to biasing means 45, which force is exerted upon arm members 46. As a result, whenever slider member 22 is removed from housing 21, the force exerted by biasing means/rubber band 45 on arm members 46 causes arm members 46 to be drawn towards each other, thereby causing housing 21 to be automatically folded upon itself along fold lines 30.

In this way, housing 21 is automatically transformed from a substantially flat, two-dimensional configuration into a fully erect, three-dimensional, pop-up, display configuration. In addition, by forming any desired fold lines 30 on panels 23 and 24 of housing 21, any shape or configuration for the three-dimensional pop-up display provided by housing 21 is able to be achieved.

Slider member 22 preferably comprises a separate and independent component cooperatively associated with housing 21. In each of the alternate embodiments depicted, slider member 22 comprises holding plate 35 and outer sleeve 36 which partially peripherally surrounds holding plate 35 and forms receiving pocket 37 between holding plate 35 and sleeve 36.

In the principal embodiment shown in FIGS. 2-6, holding plate 35 is constructed for enabling compact disc or DVD 40 to be securely affixed thereto, while a portion of CD/DVD 40 is inserted in pocket 37. As best seen in FIGS. 5 and 6, holding plate 35 comprises hub holding member 38 formed therein which is employed for being inserted within the aperture formed in CD/DVD 40 and, thereby, securely retain and mount CD/DVD 40 to holding plate 35. In addition, with CD/DVD 40 mounted to hub holding member 38 of plate 35, a portion of CD/DVD 40 is inserted in pocket 37 formed between outer sleeve 36 and holding plate 35 for assuring that CD/DVD 40 is securely mounted to slider member 22.

Figure 7:
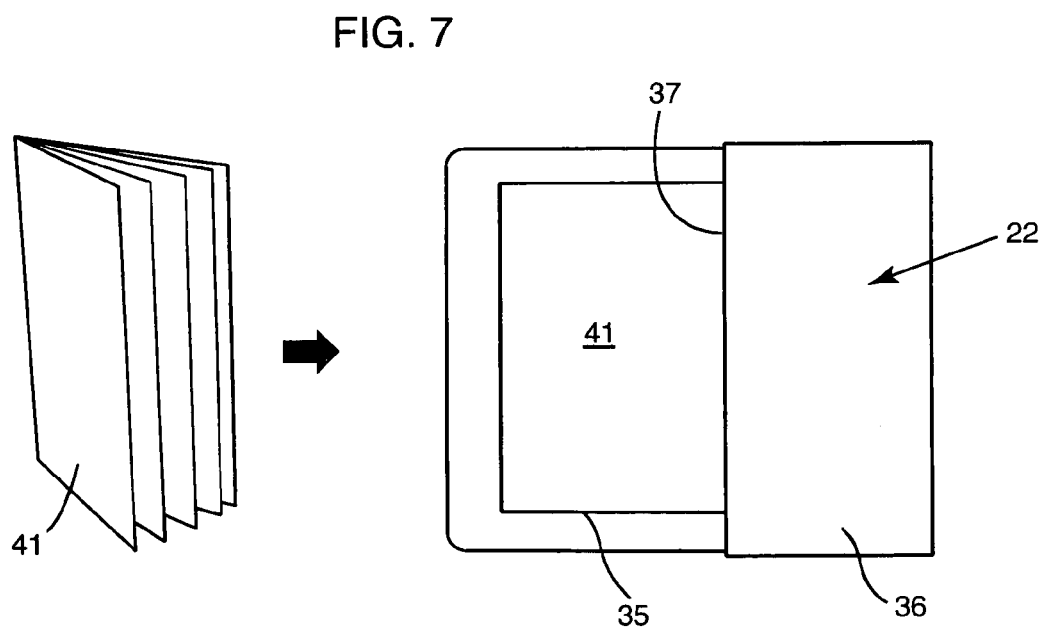
FIG. 7 is a plan view depicting an alternate embodiment of the slider member wherein printed literature is secured thereto.
Figure 8:
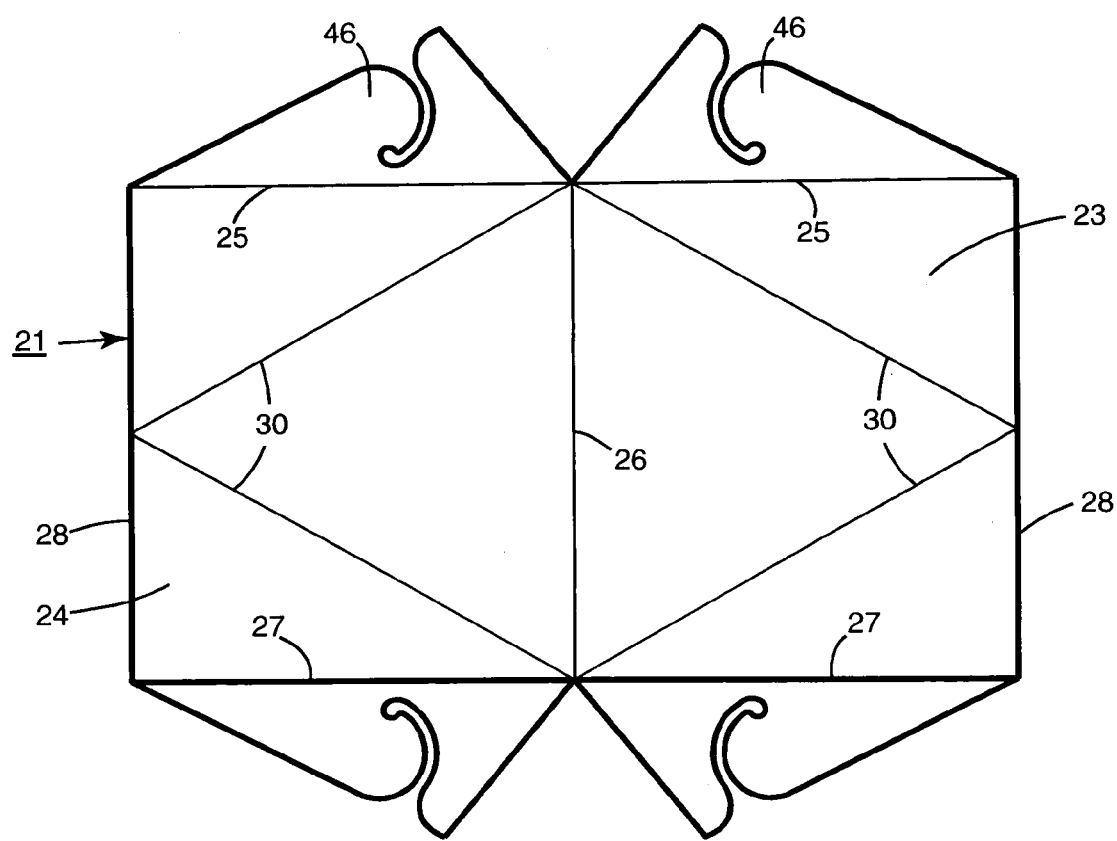
FIG. 8 is a plan view of the housing portion of the advertising/promotional system of FIG. 1, shown in a flat pre-assembled configuration.

As shown in FIG. 7, in an alternate embodiment, slider member 22 is constructed with holding plate 35, outer sleeve 36, and pocket 37 configured for securely retaining printed literature 41. In this regard, printed literature 41 may be formed in a wide variety of alternate configurations, including folded sheets of printed material, booklets, papers, drawings, advertising sheets, and the like. Regardless of the configuration employed for a printed literature 41, slider member 22 is constructed for enabling printed literature 41 to be secured to holding plate 35, with a portion of printed literature 41 inserted in pocket 37 formed between holding plate 35 and outer sleeve 36. In this way, assurance is provided that printed literature 41 is securely retained in a fully stored position on slider member 22.

In accordance with the present invention, slider member 22 is inserted in open side edge 28 of housing 21 for retention therein. In the preferred construction, the adjacent edges of open end 28 and outer sleeve 36 abut each other for enabling slider member 22 to be inserted into housing 21 a sufficient distance to assure housing 21 is maintained in its first, substantially flat configuration.

In addition, in the preferred embodiment, the abutting edges of open side edge 28 and outer sleeve 36 may be constructed with a breakaway seal, in order to enable slider member 22 to be securely affixed to housing 21 until physically disassociated from each other by the recipient or user. Although this construction is preferred, any alternate construction or configuration can be implemented without departing from the scope of the invention.

Once a user or recipient wishes to employ advertising/promotional display system/mailer 20 of the present invention, the user merely withdraws slider member 22 from its stowed position in housing 21. In this regard, if employed, the breakaway seal is severed for assuring ease of separation. If no breakaway seal assembly is employed, the user merely draws slider member 22 in the desired direction for removing slider member 22 from housing 21.

As slider member 22 is removed from housing 21, biasing means 45, preferably in the form of a rubber band, is activated for drawing side edges 25 and 27 towards each other, forcing housing 21 to be automatically folded along pre-formed fold lines 30. In this regard, in the preferred construction, biasing means/rubber band 45 is affixed to arms 46 mounted to side edges 25 and 27, which extend inside housing 21 towards each other.

Figure 4:
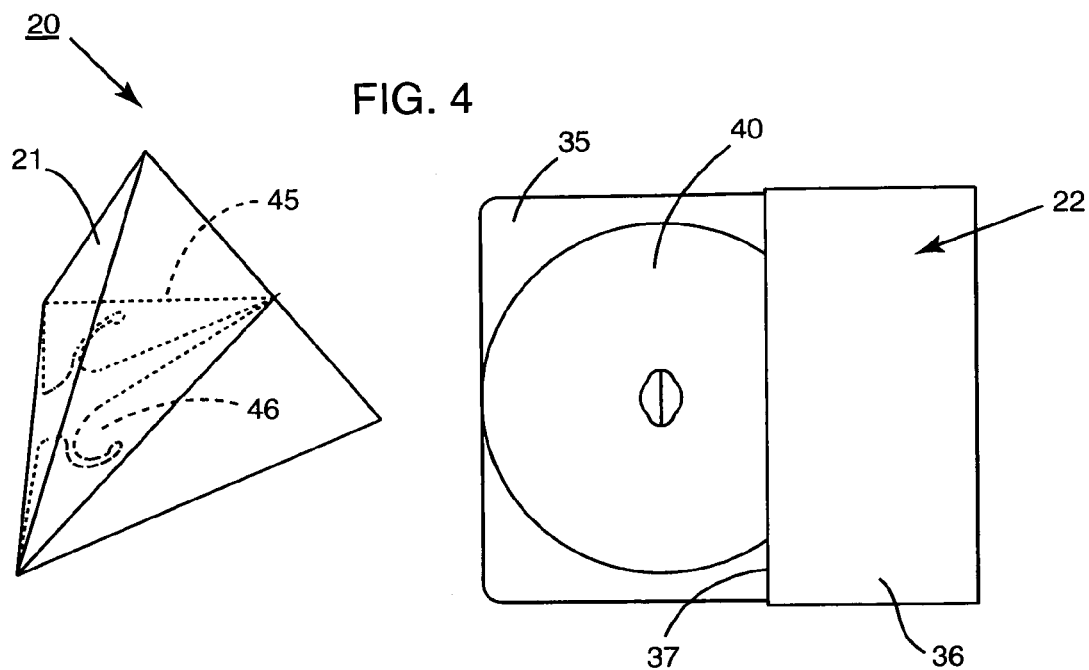
FIG. 4 is a perspective view of the advertising/promotional system of FIG. 3 with the housing fully formed into a three-dimensional, pop-up display member.

As a result of this construction, rubber band 45 is maintained in the stretched position whenever housing 21 is in its first, substantially flat, planar configuration and automatically transformed into its second, three-dimensional, pop-up, fully displayed configuration, as depicted in FIG. 4, whenever slider member 22 has been fully withdrawn from housing 21. In this way, the desired interest generating, surprising, and exciting creation of a three-dimensional, fully displayed, pop-up element is a realized, causing the user or recipient to enjoy an unexpected and on anticipated result.

In order to further enhance the interest and excitement of the user or recipient of advertising/promotional display system/mailer 20 of the present invention, the exposed surfaces of housing 21 and slider member 22 preferably incorporate indicia or pre-printed information printed thereon for delivering a desired message to the user/recipient. In this regard, the indicia employed by the sponsor or manufacturer of advertising/promotional display system/mailer 20 may be widely varied depending upon the desires of the manufacturer/sponsor. Typically, the indicia or preprinted information is selected from the group consisting of graphics, colors, alpha-numeric messages, logos, designs, and the like.

Furthermore, if desired, housing 21 may incorporate apertures, windows, or display zones formed therein which are constructed for further enhancing the excitement and interest provided by advertising/promotional display system/mailer 20 of the present invention. Regardless of the final construction or information printed on a particular advertising/promotional display system/mailer made in accordance with the present invention, it is evident that the construction of the present invention, as detailed above, provides interest, excitement, and a hands on unique result caused directly by the user or recipient in a manner which has previously been unattainable using prior art constructions.

In addition, the ability of the present invention to be used as a self-contained mailer, which can be sent to any desired recipient through conventional mail delivery systems provides a further enhancement. By employing the present invention as a mailer, the personal excitement and interest produced by the present invention can be enjoyed by a numerous individuals in an easily distributed manner.

It will thus be seen that the objects set forth above, among those made apparent from the preceding description, are efficiently attained and, since certain changes may be made in the above article without departing from the scope of the invention, it is intended that all matter contained the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An advertising/promotional display system comprising:
    A. a housing
        a) comprising a first panel and a second panel with each panel having an exposed surface on which indicia may be displayed, and
        b) being movable between a first, folded, substantially flat, two-dimensional configuration and a second, fully erect, fully displayed; three-dimensional configuration;
    B. a slider member
        a) mounted in the housing between the first panel and the second panel in cooperating association therewith, and
        b) movable between a first engaged position, wherein the slider plate is substantially fully retained within the housing, and a second disengaged position wherein the slider plate is fully removed from the housing; and
    C. activation means mounted in the housing in cooperating relationship therewith and constructed for automatically causing the housing to be formed into its second, three-dimensional configuration whenever the slider member is removed therefrom.

2. The advertising/promotional display system defined in claim 1, wherein the housing is further defined as being closed on three edges thereof and being open along a fourth edge for enabling the slider member to be cooperatively associated therewith.

3. The advertising/promotional display system defined in claim 2, wherein the first panel and the second panel of said housing further comprise pre-formed fold lines formed therein for enabling the panels to be quickly and easily converted from a substantially flat, two-dimensional configuration into a precisely desired, fully erect, three-dimensional configuration.

4. The advertising/promotional display system defined in claim 1, wherein the activation means is further defined as being mounted in the housing under tension for continuously exerting a biasing force thereon, which biasing force automatically causes the housing to move from its first two-dimensional configuration into its second fully erect, three-dimensional configuration whenever the slider member is removed therefrom.

5. The advertising/promotional display system defined in claim 4, wherein the activation means is further defined as being secured to a first side edge and a second side edge of the housing, said side edge being opposite each other, for causing said side edges to be drawn towards each other whenever the slider member is removed from the housing.

6. The advertising/promotional display system defined in claim 5, wherein said first side edge and said second side edge incorporate separate holding members, each being secured to oppose ends of the activation means for maintaining said activation means securely affixed in the housing and under tension.

7. The advertising/promotional display system defined in claim 6, wherein said activation means is further defined as comprising one selected from the group consisting of elastic bands and rubber bands.

8. The advertising/promotional display system defined in claim 1, wherein the first panel and the second panel of the housing each comprise indicia formed on the outer surface thereof for enhancing the visual appearance of the advertising/promotional display system when in its first, substantially flat configuration, as well as in its second, fully erect, three-dimensional configuration.

9. The advertising/promotional display system defined in claim 8, wherein said indicia comprises one or more selected from the group consisting of printed material, messages, colors, slogans, logos, graphics, alphanumerics, cutouts, and shaped objects.

10. The advertising/promotional display system defined in claim 1, wherein said the slider member is further defined as comprising a product holding/retaining zone.

11. The advertising/promotional display system defined in claim 10, wherein said product holding/retaining zone of the slider member is further defined as being constructed for securely holding and retaining at least one product selected from the group consisting of booklets, pamphlets, compact discs, DVDs, promotional literature, and printed material.

12. The advertising/promotional display system defined in claim 11, wherein said slider member incorporates a receiving pocket for enabling the desired product to be securely retained therein.

13. The advertising/promotional display system defined in claim 12, wherein said receiving pocket is formed from a holding plate and a cooperating sleeve peripherally surrounding the holding plate and cooperating therewith.

14. The advertising/promotional display system defined in claim 11, wherein said slider member incorporates a retaining member or hub formed therein for cooperative association with the aperture formed in the compact discs and DVDs, whereby said products are retained with the slider member.

15. The advertising/promotional display system defined in claim 1, wherein the slider member is further defined as comprising a terminating edge mounted in cooperating abutting contact with a terminating edge of housing, with said abutting terminating edges being secured to each other.

16. The advertising/promotional display system defined in claim 15, wherein said abutting terminating edges are secured to each other in an easily rupturable configuration, thereby enabling the slider member to be disconnected from the housing whenever desired by the user.

17. The advertising/promotional display system defined in claim 1, wherein said system is configured as a self-contained mailer for being mailed directly to a recipient.

* * * * *